(12) United States Patent
Browne et al.

(10) Patent No.: US 7,930,150 B2
(45) Date of Patent: Apr. 19, 2011

(54) METHOD OF DESIGNING MAGNETORHEOLOGICAL FLUID ENERGY ABSORBING DEVICE USING HYDROMECHANICAL ANALYSIS

(75) Inventors: Alan L. Browne, Grosse Pointe, MI (US); Nancy L. Johnson, Northville, MI (US); Norman M. Wereley, Potomac, MD (US); Young Tai Choi, Laurel, MD (US); Wei Hu, Rockville, MD (US); Min Mao, College Park, MD (US)

(73) Assignee: GM Global Technology Operations LLC, Detroit, MI (US)

( * ) Notice: Subject to any disclaimer, the term of this patent is extended or adjusted under 35 U.S.C. 154(b) by 610 days.

(21) Appl. No.: 11/969,546

(22) Filed: Jan. 4, 2008

(65) Prior Publication Data
US 2009/0177446 A1 Jul. 9, 2009

(51) Int. Cl.
G06F 17/50 (2006.01)
(52) U.S. Cl. .................. 703/1; 267/140.14; 267/140.15; 188/267.2
(58) Field of Classification Search ........................ 703/1
See application file for complete search history.

(56) References Cited

U.S. PATENT DOCUMENTS

| | | | |
|---|---|---|---|
| 6,279,701 B1 | 8/2001 | Namuduri et al. | |
| 6,390,252 B1 * | 5/2002 | Namuduri et al. ......... | 188/267.2 |
| 6,641,166 B2 | 11/2003 | Browne et al. | |
| 6,694,856 B1 | 2/2004 | Chen et al. | |
| 6,886,819 B2 * | 5/2005 | Kintz et al. ............... | 267/140.14 |
| 6,948,312 B1 * | 9/2005 | Goldasz et al. ................. | 60/326 |
| 6,983,832 B2 | 1/2006 | Namuduri et al. | |
| 7,051,849 B2 | 5/2006 | Browne et al. | |

FOREIGN PATENT DOCUMENTS

| | | |
|---|---|---|
| KR | 100507756 B1 | 9/2000 |
| KR | 100771960 B1 | 10/2007 |
| WO | 2007012283 A1 | 2/2007 |

OTHER PUBLICATIONS

Rosenfeld et al, "Volume-Constrained Optimization of Magnetorheological and Electrorheological Valves and Dampers", Smart Materials and Structures, 13, pp. 1303-1313, 2004.*
Stanway et al, "Applications of Electro-rheological Fluids in Vibration: A Survey", Smart Materials and Structures, vol. 5, pp. 464-462, 1996.*
Nguyen et al, "Geometry Optimization of MR Valves Constrained in a Specific Volume Using the Finite Element Method", Start Materials and Structures, vol. 16, pp. 2242-2252, Oct. 9, 2007.*
Gavin et al, "Optimal Design of MR Dampers", Proc. US-Japan Workshop on Smart Structures for Improved Seismic Performance in Urban Regions, Aug. 14, 2001, pp. 225-236.*
Li et al, "Finite Element Analysis and Simulation Evaluation of a Magnetorheological Valve", Int J Adv Manuf Technol 21:438-445, 2003.*

(Continued)

*Primary Examiner* — Mary C Jacob
(74) *Attorney, Agent, or Firm* — Quinn Law Group, PLLC

(57) ABSTRACT

A method of designing a magnetorheological (MR) fluid energy absorbing damper is provided that uses hydromechanical analysis with lumped parameters to allow a determination as to whether a potential damper design will provide predetermined characteristics, such as a desired dynamic force range and maximum piston velocity, with a selected MR fluid and yield stress and preferably meeting predetermined geometric limitations.

12 Claims, 6 Drawing Sheets

OTHER PUBLICATIONS

El-Aouar, Walid, "Finite Element Analysis Based Modeling of Magneto Rheological Dampers", Thesis, Virginia Polytechnic Institute, 2002.*

Zhang et al, "A Magnetic Design Method of MR Fluid Dampers and FEM Analysis on Magnetic Saturation", Journal of Intelligent Material Systems and Structures, vol. 17, Aug./Sep. 2006.*

* cited by examiner

METHOD OF DESIGNING MAGNETORHEOLOGICAL FLUID ENERGY ABSORBING DEVICE USING HYDROMECHANICAL ANALYSIS

TECHNICAL FIELD

The invention relates to a method of designing a magnetorheological fluid energy absorbing device using hydromechanical analysis, especially using lumped hydraulic parameters.

BACKGROUND OF THE INVENTION

Magnetorheological (MR) fluids belong to a class of controllable fluids. The essential characteristic of these fluids is their ability to change from a free-flowing, linear, viscous liquid to a semi-solid with controllable yield strength in milliseconds when exposed to a magnetic field. In the absence of an applied field, MR fluids are reasonably well approximated as Newtonian fluids.

Magnetorheological energy absorption (MREA) devices harness the ability of MR fluids to change yield strength with a change in applied field. MREA devices are referred to as "tunable", meaning that the resultant yield strength, and therefore energy absorption capability, can be varied by controlling the applied magnetic field. MREA devices have been identified as candidates for tunable impact energy absorption applications, meaning those in which a high shock load is applied during a short time period. Heretofore, MREA devices have been less than ideal for many automotive applications related to impact energy management and control of deceleration because of their large size and the lack of significant field controlled tunability of their stroking force (i.e., damping force) over the required range of stroking velocities. Tunability of damping force (i.e., dynamic force range) is critical to the desirability and usefulness of MREA devices in many applications, such as automotive applications where control of deceleration is important. For example, a damping force suitable for absorbing energy in one impact event may be too large for another, in which case tunability of the MREA device to respond with a lower damping force, and therefore a lower deceleration, is desirable.

SUMMARY OF THE INVENTION

A method of designing a magnetorheological (MR) fluid energy absorbing damper is provided that uses hydromechanical analysis with lumped parameters to allow a determination as to whether a potential damper design will provide predetermined characteristics, such as a desired tunable dynamic force range for piston stroking velocities up to a specified maximum value, with a selected MR fluid and yield stress while meeting predetermined geometric limitations.

The method includes specifying predetermined damper characteristics including force and velocity parameters. Properties of the MR fluid are specified, including a yield stress. Geometric properties of the damper are then calculated based on the specified predetermined damper characteristics and properties of the MR fluid. Lumped parameters are used to characterize the flow of the MR fluid in the damper. Geometric properties may be calculated for multiple Reynolds numbers and plotted, with one of the sets of calculations for one of the Reynolds numbers selected that meets a predetermined geometric limitation, such as a packaging limitation on an overall diameter or length of the damper.

Furthermore, damper specifications related to magnetic properties of the damper are then determined, and are based at least partially on the calculated geometric properties. Such damper specifications include coil size, turn number and magnetic flux return size.

Next, finite element method (FEM) analysis is applied to a first potential damper design characterized by the calculated geometric properties and the determined damper specifications to determine whether a magnetic field is achieved by the potential damper design that provides the specified predetermined damper characteristics. If the magnetic field is achieved, the first potential damper design is selected as a viable design, such as for use in a motor vehicle or in another application. If the magnetic field is not achieved, various steps of the method are repeated using a new selected yield stress, including calculating geometric properties, determining damper specifications related to magnetic properties, and applying FEM analysis to alternative potential damper designs characterized by different selected yield stress values until a magnetic field is achieved by one of the alternative potential damper designs that provides the specified predetermined damper characteristics.

"Lumped parameters" are a simplification in a mathematical model of a physical system in which variables that are actually spatially distributed fields are represented as single scalars. For example a Reynolds number which varies within a flow channel is replaced by a Reynolds number representative of a homogeneous flow across the channel. A Reynolds number is a dimensionless number known to those skilled in the art of fluid dynamics as the ratio of inertial forces to viscous forces for given flow conditions. Similarly, a Bingham number is a dimensionless number known to those skilled in the art of fluid dynamics that is proportional to the ratio of yield stress to viscous stress.

The design method may be for the design of an MREA device having a flow-mode, bi-fold design that is compact enough for a variety of applications, including certain automotive applications, and that exhibits tunability over the force levels and at the velocities required for effective impact energy management in certain applications, such as automobiles, helicopters, trains, and other transportation vehicle applications. For example, the MREA device may be utilized in certain automotive applications including, but not limited to, a knee bolster, a steering wheel assembly, a seat belt load limiter, child seat tethers, sliding seats, crash or crush boxes (i.e., dedicated energy absorption devices between a bumper and a vehicle frame) and bumper systems. The desired range of tunability and expected piston velocities may be a function of the expected vehicle velocity range (e.g., 10 miles per hour to 30 miles per hour), the vehicle mass when fully loaded versus that when unloaded (e.g., carrying only one occupant), or a ratio of maximum to minimum occupant mass.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
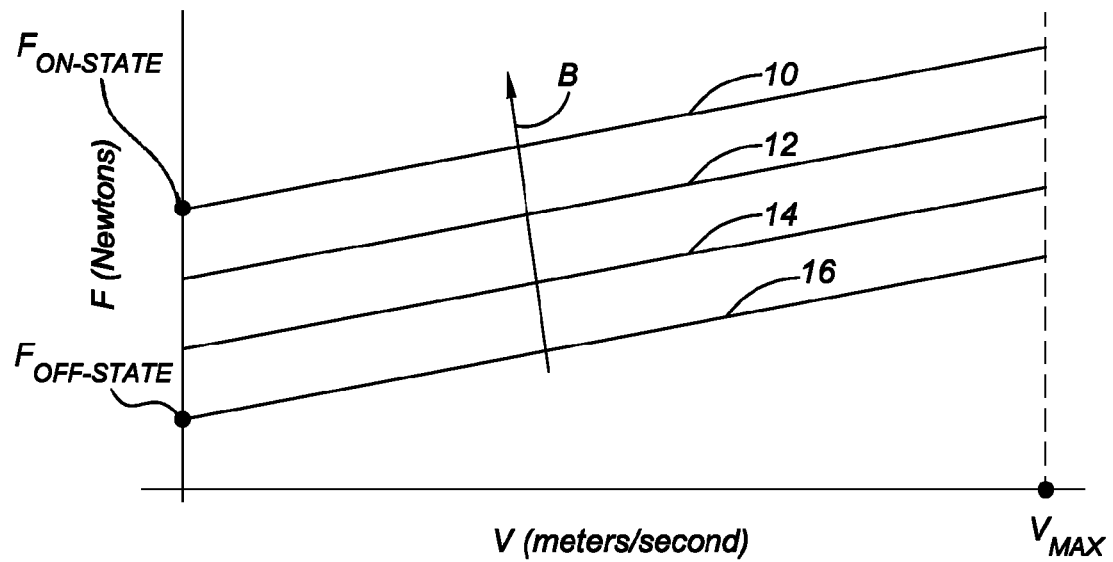
FIG. 1 is a graph of damper force (Newtons) versus damper piston velocity (meters per second) for a magnetorheological energy absorbing device at various magnetic flux densities.

Referring to the drawings, wherein like reference numbers refer to like components, FIGS. 1-5 illustrate different embodiments of magnetorheological (MR) fluid energy absorbing devices, also referred to herein as magnetorheological fluid energy absorbers (MREAs) or MR fluid energy absorbing dampers. The MR fluid energy absorbing devices of FIGS. 1-5 are exemplary in nature only, and are described herein to illustrate one type of MR fluid energy absorbing device that may be designed according to the method 400 of FIGS. 6A-6B. The method 400 of designing an MR fluid energy absorbing damper described with respect to FIG. 6A-6B is not limited to the MR fluid energy absorbing devices of FIGS. 1-5. However, the MR fluid energy absorbing devices of FIGS. 1-5 will first be described in detail prior to describing the method 400 by which they may be designed.

FIG. 1 illustrates the effect of increasing flux density (direction of arrow B) of a magnetic field applied to a magnetorheological fluid energy absorber (MREA) on the damping force of the MREA. The increase in damping force (or shear force) at any given velocity (or shear rate) is due to the increase in yield stress of an MR fluid when subjected to a magnetic field perpendicular to the direction of flow of the fluid. For a given flux density (which corresponds with a given level of electrical current to electrical coils in the MREA), the damping force (F) increases linearly with the piston speed of the damper at a rate proportional to the viscosity of the carrier fluid. The piston speed or velocity (V) of the damper is a function of the speed of an impacting force acting on the damper. FIG. 1 also illustrates that the slope of damper force versus piston speed of the damper remains relatively constant at different flux densities. It should be appreciated that the behavior of the damper force at low piston velocities, i.e., in the pre-yield range, is nonlinear; however, at higher piston velocities, i.e., in the post-yield range, the ratio of force to velocity is approximately linear, being just a constant related with the viscosity of the carrier fluid. Line 10 represents the shear force as a function of shear rate for the maximum achievable flux density specific to the design of the damper, referred to herein as "on-state" and resulting in $F_{ON\text{-}STATE}$ when the piston is at zero velocity; line 16 represents the performance of the damper under zero applied field (i.e., no current supplied to the electrical coils), referred to herein as "off-state" and resulting in $F_{OFF\text{-}STATE}$ when the piston is at zero velocity, with lines 12 and 14 representing various levels of flux density therebetween. The damper force is "tunable" between that achieved at the maximum flux density state and that achieved at the zero flux density state by varying the applied current (or voltage), with the ratio of the damper force achieved at flux saturation to the zero-field damper force being referred to as the turn-up ratio, tunability or dynamic force range. It is apparent from FIG. 1 that, in order to achieve a selected ratio of tunability of the damper at increasing damper piston speeds, the slope of the damper force versus damper piston velocity (i.e., the fluid viscosity) should be minimized; a steep slope will result in a relatively high zero-field damper force, and thereby decrease the ratio of the damper force at maximum flux density to damper force at zero-field. Those skilled in the art will recognize that the chart of FIG. 1 is representative of the relationship between shear stress and shear rate of a typical MR fluid, with the slope of each line being equivalent to viscosity of the fluid. Thus, decreasing the viscosity of the fluid promotes a higher turn-up ratio.

Figure 2A:
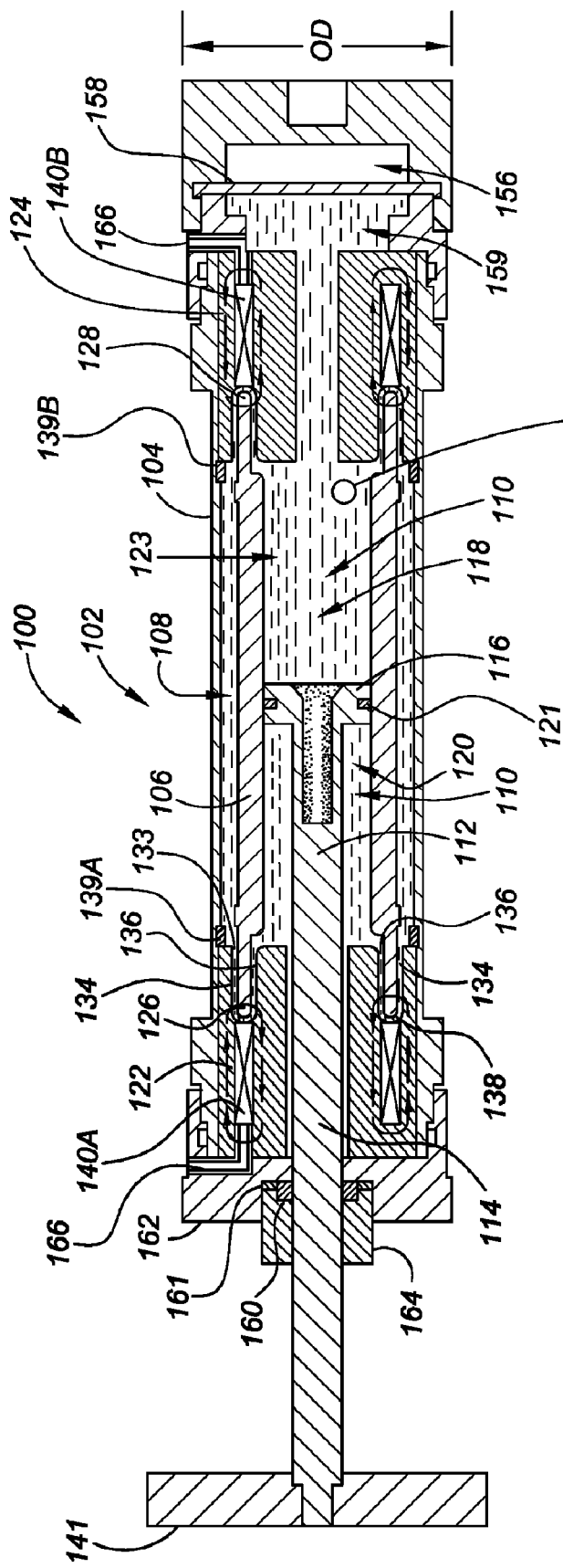
FIG. 2A is a schematic illustration in cross-sectional view of a first embodiment of a magnetorheological energy absorbing device.
Figure 2C:
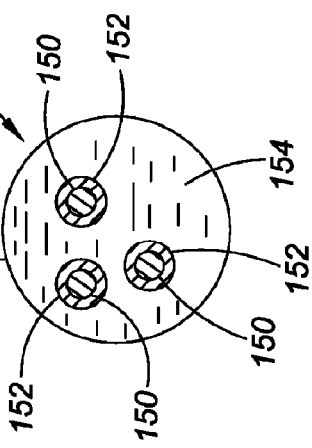
FIG. 2C is a schematic illustration in schematic cross-sectional fragmentary view of the magnetorheological fluid, including coated magnetizable particles, used in the magnetorheological energy absorbing device of FIG. 2A.

Referring to FIG. 2A, a first embodiment of a magnetorheological energy absorbing (MREA) device 100 includes a damper assembly 102 that is bounded by an outer tube 104. An inner tube 106 is surrounded by the outer tube 104 such that an outer chamber 108 is partially defined between the two tubes 104, 106. The inner tube 106 defines an inner chamber 110. A piston 112 is movable within the inner tube 106 and includes a piston rod 114 and a piston head 116 secured to the rod 114. The piston head 116 is guided by and spans the inner chamber 110 and divides the inner chamber 110 into a first portion 118 that is on the opposite side of the piston head 116 from the rod 114 and a second portion 120 that is on the same side of the piston head 116 as the rod 114. The outer chamber 108 and the inner chamber 110 are filled with an MR fluid 123, the characteristics of which are described further below. A piston ring 121 helps to seal the piston head 116 to the walls of the inner tube 106, ensuring that flow of MR fluid 123 within the MREA, and especially within fluid cavities 133 described below, is not compromised by unintended flow paths.

First and second magnetic end structure assemblies 122, 124 are positioned adjacent to either end 126, 128 of the inner tube 106. The magnetic end structure assemblies 122, 124 are also referred to as magnetic flux returns and are preferably but not necessarily American Iron and Steel Institute standard (AISI) 12L14 low carbon steel with a nominal carbon content of 0.14% which has a high value of applied field for magnetic saturation. To improve its magnetic properties, the AISI 12L14 material may be annealed at 1600 degrees Fahrenheit for one hour and slowly cooled to room temperature before machining.

Figure 2B:
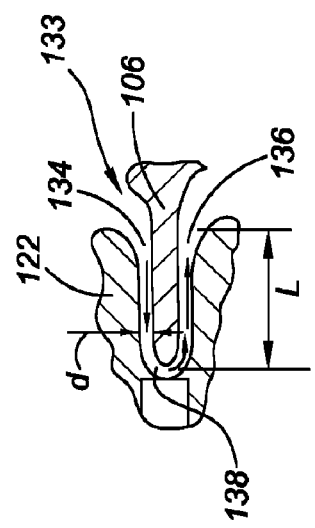
FIG. 2B is a schematic illustration in schematic cross-sectional fragmentary view of a bi-fold valve-type or fluid channel or cavity formed by the magnetorheological energy absorbing device of FIG. 2A.

The magnetic end structure assemblies 122, 124 are formed with annular slots that receive and surround the ends 126, 128 of the inner tube 106, defining a consistently dimensioned annulus gap or fluid cavity 133 between the tube 106 and each of the magnetic structure assemblies 122, 124. As best seen in FIG. 2B, the fluid cavities 133 each have an outer channel portion 134, an inner channel portion 136 that is parallel with the outer channel portion, and a looped portion 138 connecting the channel portions 134, 136. The fluid cavity 133 is referred to herein as a bi-fold valve. MR fluid 123 flows through the cavity 133, as further described below, such that the cavity 133 functions as a flow-mode bi-fold MR valve and may be referred to herein as an MR valve. A "flow-mode" MR valve is one in which the fluid flow is pressure driven and is not due to relative movements of bounding channel/cavity walls in contact with the fluid, as in a shear mode. (The outer channel portion 134, inner channel portion 136 and looped portion 138 are numbered with respect to the magnetic end structure assembly 122; the magnetic end structure assembly 124 forms a like structure and cavity 133 in a mirror image of magnetic end structure assembly 122, as is apparent in FIG. 2.) The openings at the ends of the inner channel portion 136 and the outer channel portion 134 open to the inner chamber 110 and the outer chamber 108, respectively. Support rings 139A, 139B help maintain the relative positions of the end structure assemblies 122, 124 with respect to the inner tube 106 and outer tube 104. As best shown in FIG. 2B, the entire fluid cavity 133 (channel portions 134, 136 and looped portion 138) is defined in preferred embodiments by surfaces of the inner tube 106 and of the magnetic structure assembly 122 that are without discontinuity in slope or curvature at adjacent portions, without edges or abrupt changes in geometry, to promote laminar flow of fluid between the inner chamber 110 and the outer chamber 108 through the fluid cavity 133.

The fluid cavities 133 (channel portions 134, 136 and looped portion 138) present at either end of the inner chamber 110 fluidly connect the inner chamber 110 with the outer chamber 108, allowing magnetorheological fluid 123 to flow from the inner chamber 110 to the outer chamber 108 through the fluid cavity adjacent magnetic end structure assembly 124 and vice versa through the fluid cavity 133 adjacent magnetic end structure assembly 122, assuming the piston 112 moves from left to right in FIG. 2A within the inner tube 106 in response to an impact on movable impact member 141 connected to the piston 112.

The first and second magnetic end structure assemblies 122, 124 each have an opening in which an annular electrical coil 140A, 140B, respectively, is retained. The coils 140A, 140B are configured to generate a magnetic field, as indicated by the arrows generally circulating around each cross-sectional area of the coils 140A, 140B in FIG. 2A. Referring to FIG. 2B, which represents the fluid cavity 133 at the upper left in FIG. 2A, the field generated by coil 140A of FIG. 2A influences fluid flow along a length L of the channel portion 134 and along the same length L of channel portion 136 as the fluid flows in the direction of the arrows shown in FIG. 2B, from outer chamber 108 to inner chamber 110 due to the movement of the piston 112. When the coils 140A, 140B are energized, the magnetic field causes the MR fluid 123 within the channel portions 134, 136 along the length L to attain a higher yield stress, resulting in an increase in damper force in response to an impact force on a movable impact member 141 and resultant movement of the piston 112. Fluid flows through the channel portions 134, 136 substantially perpendicular to the magnetic field, allowing the field to cause the maximum amount of increased yield stress or apparent viscosity in the MR fluid 123. The magnitude of the field is controllable by controlling the input current to the coils 140A, 140B. Thus, varying the field allows the increase in yield stress of the MR fluid 123 to vary between the yield stress when no field is generated by the coils 140A, 140B and a maximum yield stress at flux saturation or when the maximum current is sent to the coils 140A, 140B. The fluid cavity 133 has no moving parts; thus, the yield stress of the MR fluid 123 simply resists the pressure driving the fluid through the fluid cavity 133.

In order to increase the effectiveness of the MREA device 100, the MR fluid 123 is specifically designed to have a low zero-field viscosity (i.e., minimize slope of the lines in FIG. 1) and therefore achieve a low zero-field damper force at a given piston velocity, thereby enabling a turn-up ratio desired for a more compact device 100 at the force and speed limitations of the various applications for which the device is intended (e.g., in one application, a zero-field damper force not greater than 2 kilonewtons over a piston velocity range of 0 to about 7 meters per second). Specifically, referring to FIG. 2C, the MR fluid 123 includes magnetizable particles 150 with a silicate coating 152 thereon suspended in a carrier fluid 154. The coating 152 is a hydrophobic group that causes the viscosity and zero-field yield stress of the MR fluid 123 to decrease. Comparative testing has shown that the coating 152 according to one embodiment inhibits oxidation of the iron particles in air at elevated temperature and makes the particle surface hydrophobic. Further, the yield stress at maximum applied field of an MR fluid made with coated particles is only slightly reduced and the viscosity and yield stress at zero-field are greatly reduced as compared to a similar fluid made with uncoated particles. The properties of an MR fluid prepared with treated particles are shown in Table 1 below in comparison with a similar MR fluid prepared with untreated particles. Table 1 shows that the treatment has only a small effect on the on-state yield stress.

A coating of octyltriethoxysilane (OTES) provides an unexpected benefit in the form of greatly reduced off-state viscosity and yield stress. As shown in Table 1, the viscosity (in centipoise) of 40 and 45 volume percent iron MR fluids is reduced by about a factor of four and the off-state yield stress is reduced by more than a factor of 8-10 as compared to similar MR fluids prepared with untreated particles. This reduction in apparent viscosity will translate into reduced off-state drag when the MR fluid is used in a damper or torque transfer device.

TABLE 1

Off-state viscosity and yield stress for 40 and 45% MR fluids prepared with OTES-treated iron.

| Sample Code | Iron Volume Fraction | Treatment | Viscosity 40° C. [cp] | Yield Stress 40° C. [Pa] |
|---|---|---|---|---|
| 13MAG110 | 40% | Untreated | 543 | 415 |
| 14MAG062 | 40% | Treated | 128 | 37 |
| 14MAG074 | 45% | Untreated | 514 | indistinct |
| 14MAG077 | 45% | Treated | 136 | 57 |

The particles 150 with the coating 152 thereon may be present in about 10 to 60 percent by volume and the carrier fluid 154 may be present in about 40 to 90 percent by volume. The hydrophobic groups generally may be nonpolar, additional examples of which include linear aliphatic, branched aliphatic and linear or branched aromatic chains. For example, the protective coating may include hydrophobic groups including, but not limited to methyl, ethyl, pentyl, hexyl, heptyl and/or octyl or longer hydrocarbon chains. Preferably, but not necessarily, the coating 152 on the particle 150 may be present in about 0.01 to about 0.1 weight percent of the particle with the coating thereon. The carrier fluid 154 may include at least one of water, an alcohol, a glycol or polyol, silicone oil or hydrocarbon oil. Examples of suitable alcohols include, but are not limited to, heptanol, benzyl alcohol, ethylene glycol and/or polypropylene glycol. Examples of suitable hydrocarbon oils include, but are not limited to, polyalphaolefins (PAO, mineral oils and/or polydimethylsiloxanes). Other suitable materials for the carrier fluid 154 are described hereafter. Suitable magnetizable particles are available from BASF Company under the trade name CM and HS, for example. A magnetic flux density ranging from about 0.01 tesla to about 2 tesla, for example, may be applied to the MR fluid 123 to increase the viscosity thereof.

Solid particles 150 suitable for use in the carrier fluids 154 are magnetizable, low coercivity (i.e., little or no residual magnetism when the magnetic field is removed), finely divided particles of iron, nickel, cobalt, iron-nickel alloys, iron-cobalt alloys, iron-silicon alloys and the like which may be spherical or nearly spherical in shape and have a diameter in the range of about 0.1 to 100 microns. Since the particles 150 may be employed in noncolloidal suspensions, it is preferred that the particles 150 be at the small end of the suitable range, preferably in the range of 1 to 10 microns in nominal diameter or particle size. The particles used in MR fluids are larger and compositionally different than the particles that are used in "ferrofluids" which are colloidal suspensions of, for example, very fine particles of iron oxide having diameters in the 10 to 100 nanometers range. Ferrofluids operate by a different mechanism from MR fluids. MR fluids are suspensions of solid particles which tend to be aligned or clustered in a magnetic field and drastically increase the effective viscosity or flowability of the fluid.

A suitable magnetizable solid for the solid particles 150 may include CM carbonyl iron powder and HS carbonyl iron powder, both manufactured, for example, by BASF Corporation. The carbonyl iron powders are gray, finely divided powders made of highly pure metallic iron. The carbonyl iron powders are produced by thermal decomposition of iron pentacarbonyl, a liquid which has been highly purified by distillation. The spherical particles include carbon, nitrogen and oxygen. These elements give the particles a core/shell structure with high mechanical hardness. CM carbonyl iron powder includes more than 99.5 wt % iron, less than 0.05 wt % carbon, about 0.2 wt % oxygen, and less than 0.01 wt % nitrogen, with a particle size distribution of less than 10% at 4.0 μm, less than 50% at 9.0 μm, and less than 90% at 22.0 μm, with true density >7.8 g/cm3. The HS carbonyl iron powder includes minimum 97.3 wt % iron, maximum 1.0 wt % carbon, maximum 0.5 wt % oxygen, maximum 1.0 wt % nitrogen, with a particle size distribution of less than 10% at 1.5 μm, less than 50% at 2.5 μm, and less than 90% at 3.5 μm. As indicated, the weight ratio of CM to HS carbonyl powder may range from 3:1 to 1:1 but preferably is about 1:1.

Examples of other iron alloys which may be used as the magnetizable particles 150 include iron-cobalt and iron-nickel alloys. Iron-cobalt alloys may have an iron-cobalt ratio ranging from about 30:70 to about 95:5 and preferably from about 50:50 to about 85:15, while the iron-nickel alloys have an iron-nickel ratio ranging from about 90:10 to about 99:1 and preferably from about 94:6 to 97:3. The iron alloys maintain a small amount of other elements such as vanadium, chromium, etc., in order to improve ductility and mechanical properties of the alloys. These other elements are typically present in amounts less than about 3.0 percent total by weight.

The magnetizable particles 150 may be in the form of metal powders. The particle size of magnetizable particles 150 may be selected to exhibit bimodal characteristics when subjected to a magnetic field. Average particle diameter distribution size of the magnetizable particles 150 is generally between about 1 and about 100 microns, with ranges between about 1 and about 50 microns being preferred.

The magnetizable particles 150 may be present in bimodal distributions of large particles and small particles with large particles having an average particle size distribution between about 5 and about 30 microns. Small particles may have an average particle size distribution between about 1 and about 10 microns. In the bimodal distributions as disclosed herein, it is contemplated that the average particle size distribution for the large particles will typically exceed the average particle size distribution for the small particles in a given bimodal distribution. Thus, in situations where the average particle distribution size for large particles is 5 microns, for example, the average particle size distribution for small particles will be below that value.

The magnetizable particles 150 may be spherical in shape. However, it is also contemplated that magnetizable particles 150 may have irregular or nonspherical shapes as desired or required. Additionally, a particle distribution of nonspherical particles as disclosed herein may have some nearly spherical particles within its distribution. Where carbonyl iron powder is employed, it is contemplated that a significant portion of the magnetic particles 150 will have a spherical or near spherical shape.

The magnetic particles 150 with coating 152 can be integrated into a suitable carrier fluid 154. Suitable carrier fluids can suspend the MR particles but are essentially nonreactive. Such fluids include, but are not limited to, water, organic fluids or oil-based fluids. Examples of suitable organic and/or oil based carrier fluids include, but are not limited to, cyclo-paraffin oils, paraffin oils, natural fatty oils, mineral oils, polyphenol ethers, dibasic acid esters, neopentylpolyol esters, phosphate esters, polyesters, synthetic cyclo-paraffin oils and synthetic paraffin oils, unsaturated hydrocarbon oils, monobasic acid esters, glycol esters and ethers, silicate esters, silicone oils, silicone copolymers, synthetic hydrocarbon oils, perfluorinated polyethers and esters, halogenated hydrocarbons, and mixtures or blends thereof. Hydrocarbon oils, such as mineral oils, paraffin oils, cyclo-paraffin oils (also as napthenic oils), and synthetic hydrocarbon oils may be employed as carrier fluids. Synthetic hydrocarbon oils include those oils derived from the oligomerization of olefins such as polybutenes and oils derived from higher alpha olefins of from 8 to 20 carbon atoms by acid catalyzed dimerization, and by oligomerization using trialuminum alkyls as catalysts. Such poly alpha olefin oils can be employed as preferred carrier fluids. It is also contemplated that the oil may be a suitable material such as oils derived from vegetable materials. The oil of choice may be one amenable to recycling and reprocessing as desired or required.

The carrier fluid 154 of choice may have a viscosity between about 2 and about 1,000 centipoises at 25° C. with a viscosity between about 3 and about 200 centipoises being preferred and a viscosity between about 5 and about 100 centipoises being particularly preferred. It is contemplated that the carrier fluid 154 and magnetizable particles 150 with coating 152 can be admixed to provide a composition having magnetizable particles 150 with coating 152 in an amount between about 30 and about 60 percent by volume.

Another suitable carrier fluid 154 is a hydrogenated polyalphaolefin (PAO) base fluid, designated SHF21, manufactured, for example, by Mobil Chemical Company. The material is a homopolymer of 1-decene which is hydrogenated. It is a paraffin-type hydrocarbon and has a specific gravity of 0.82 at 15.6° C. It is a colorless, odorless liquid with a boiling point ranging from 375° C. to 505° C., and a pour point of −57° C.

Alternatively, the MR fluid 123 may include 10 to 14 wt % of a polyalphaolefin liquid, 86 to 90 wt % of treated magnetizable particles, optionally up to 0.5 wt % fumed silica, and optionally up to 5 wt % (of the liquid mass) of a liquid phase additive.

Fumed silica is a suspending agent added in about 0.05 to 0.5, preferably 0.5 to 0.1, and most preferably 0.05 to 0.06 weight percent of the MR fluid 123. The fumed silica is a high purity silica made from high temperature hydrolysis having a surface area in the range of 100 to 300 square meters per gram.

Referring again to FIG. 2A, the MREA device 100 includes a pneumatic chamber 156 operatively connected with the MR fluid 123 in fluid chamber 159 through a flexible diaphragm 158. The pneumatic chamber 156 is preferably filled with an inert gas, such as nitrogen or air, at, for example, 800 psi. The pneumatic chamber 156 functions as an accumulator mechanism to accommodate the change in volume of the rod 114 in the chamber 110 that results from piston 112 movement and to prevent cavitation of MR fluid 123 on the low pressure side (which is the second portion 120 of inner chamber 110 as the piston 112 moves to the right in FIG. 2A; first portion 118 of the inner chamber 110 as the piston 112 moves to the left in FIG. 2A). In contrast to a typical MREA device 100, the coils 140A, 140B were moved off the piston 112 to fixed locations adjacent either end of the inner tube 106. One of the advantages of such arrangement is that the size of the piston head 116 and the effective MR valve diameter (i.e., the effective diameter of the cavity 133, which is a function of the diameter of the outer channel portion 134 and of the inner channel portion 136) can be more flexibly configured and not tied directly to or constrained by each other as they are when the coils are mounted to the piston 112. This approach enables a reduction of zero-field damping force at high piston operating velocities by decreasing the effective piston-valve area ratio without decreasing the maximum field damping force. In one example embodiment, the outer diameter (OD) of the MREA device 100 at its largest point preferably does not exceed 5 centimeters. Thus, damper force and tunability requirements are met while maintaining a compact overall size that is convenient for packaging in a variety of locations, such as on an automobile.

Yet another feature of the MREA device 100 that promotes the ability to achieve the desired tunability is the addition of a gasket 161 (which may also be referred to as a seal, packing, or packing flange) between the contacting surface of a hydraulic cap 162 and a U-cup holder or gland 164. A U-cup seal 160 is positioned between the gasket 161 and the rod 114. The hydraulic cap 162 is secured around the outer tube 104 and includes passages for connector wires 166 that carry electrical current to the coils 140A, 140B. An electrical connector (not shown) mounts to the hydraulic cap 162 in operative connection with the connector wires 166 similar to the electrical connector shown and described below with respect to FIGS. 3 and 4. The gasket 161 helps prevent leakage of carrier fluid 154 past the U-cup holder 164 from the inner chamber 110 along the interface of the rod 114 and the magnetic end assembly 122. Carrier fluid leakage increases the magnetizable particle concentrations which can result in excessively high zero-field fluid viscosity and an off-state damping force higher than the desired or expected value. This, in turn, makes achieving a specific upturn ratio such as 2:1 more difficult with a compact MREA device. Carrier fluid leakage can ultimately lead to a clogged fluid path in the fluid cavity 133 of the MREA device 100 and may produce a semi-solid sedimentation at the bottom end (sedimentation pocket) of the MREA device 100. Note that the location of the "bottom end" varies depending on whether the MREA device 100 is installed for use horizontally, vertically, or otherwise.

Referring to the MREA device 100, assuming a maximum piston velocity of 6.71 meters per second, a zero-field damper force of 2 kN, an MR fluid (i.e., MR fluid 123 with coated magnetizable particles 150) with a zero-field fluid viscosity of 0.4 Pa-sec, a maximum field yield stress of 80 kPa at 0.7 tesla, and a fluid density of 3.863 kg per cubic meter, a fluid cavity 133 with smooth surfaces that are without discontinuity in slope or curvature at adjacent portions, and without edges, to promote laminar flow, an outer diameter OD of the MREA device 100 of 5 cm, and a length $L_t$ (here $L_t$=4 L, as there are four portions of the two separate cavities on either end of the inner chamber 110 that have an active length L (inner channel portion 136 and outer channel portion 134 for each cavity 133)) of the flow reversing path being 64 mm and a gap d (i.e., the width of channels (inner portion 136, and outer portion 134) of the bi-fold cavity 133) being 1.2 mm (see FIG. 2B), a tunability of greater than 2 to 1 can be achieved according to known fluid mechanics formulae. Furthermore, the overall length of the MREA device performing according to these requirements is not more than 8 cm. The damper force F of a bi-fold MREA device can be obtained as follows:

$$F=A_p(\Delta P_\eta+\Delta P_\tau)$$

where $$\Delta P_\eta = f\frac{\rho L_t V_d^2}{2D_h} \text{ and } \Delta P_\tau = \frac{2L_t \tau_y}{d}.$$

Here $\Delta P_\eta$ is the Newtonian pressure drop, $\Delta P_\tau$ is the pressure drop due to the yield stress of an MR fluid, $\tau_y$ is the yield stress of an MR fluid, $\rho$ is the fluid density, d is the gap of the MR bi-fold valve-type cavity described above and $L_t$ is the total active length of the bi-fold valve-type cavities in the MREA device. $D_h$ is the hydraulic diameter which is used for non-circular valve path. For a bi-fold MREA device, for simplicity, the annulus gap of the bi-fold valve-type cavity is approximated by parallel plates. As a result, the hydraulic diameter $D_h$ is given by $D_h$=2 d. The friction factor f may be calculated based on the Reynolds number for flow through the gap d, as is known. To promote laminar flow and a turn-up ratio of 2 in the preferred embodiment, the Reynold's number is kept below 850 for piston speeds ranging from 0 to 7 m/s. In the case of a bi-fold valve-type cavity, the Reynold's number is directly proportional to both the fluid velocity (and piston velocity) and the gap d, and is kept low by limiting either or both of these values. $V_d$ is the average fluid velocity in the gap d given by $$V_d = \frac{A_p V_p}{A_d} = \overline{A} V_p$$

Here $A_p$ is the effective piston area, $A_d$ is the cross-sectional area of the MR valve gap, and $V_p$ is the piston velocity. Assuming a cylindrical piston head, $$A_p = \pi r_p^2 - \pi r_r^2,$$

with $r_p$ being the radius of the piston head and $r_r$ being the radius of the piston rod. For a cylindrical annulus, $$A_d = \pi(R_2-R_1)(R_1+R_2),$$

with $R_2$ being the outer radius of the annulus and $R_1$ being the inner radius of the annulus. The bi-fold cavity 133 has two such annuli, one at the inner channel 136 and one at the outer channel 134. The ratio of $A_p/A_d$ is the fluid velocity amplification factor, $\overline{A}$, and determines the fluid velocity in the gap d for a given piston speed. If the amplification factor is large, the fluid velocity in the gap d can be large, even if the piston velocity is small.

Figure 3:
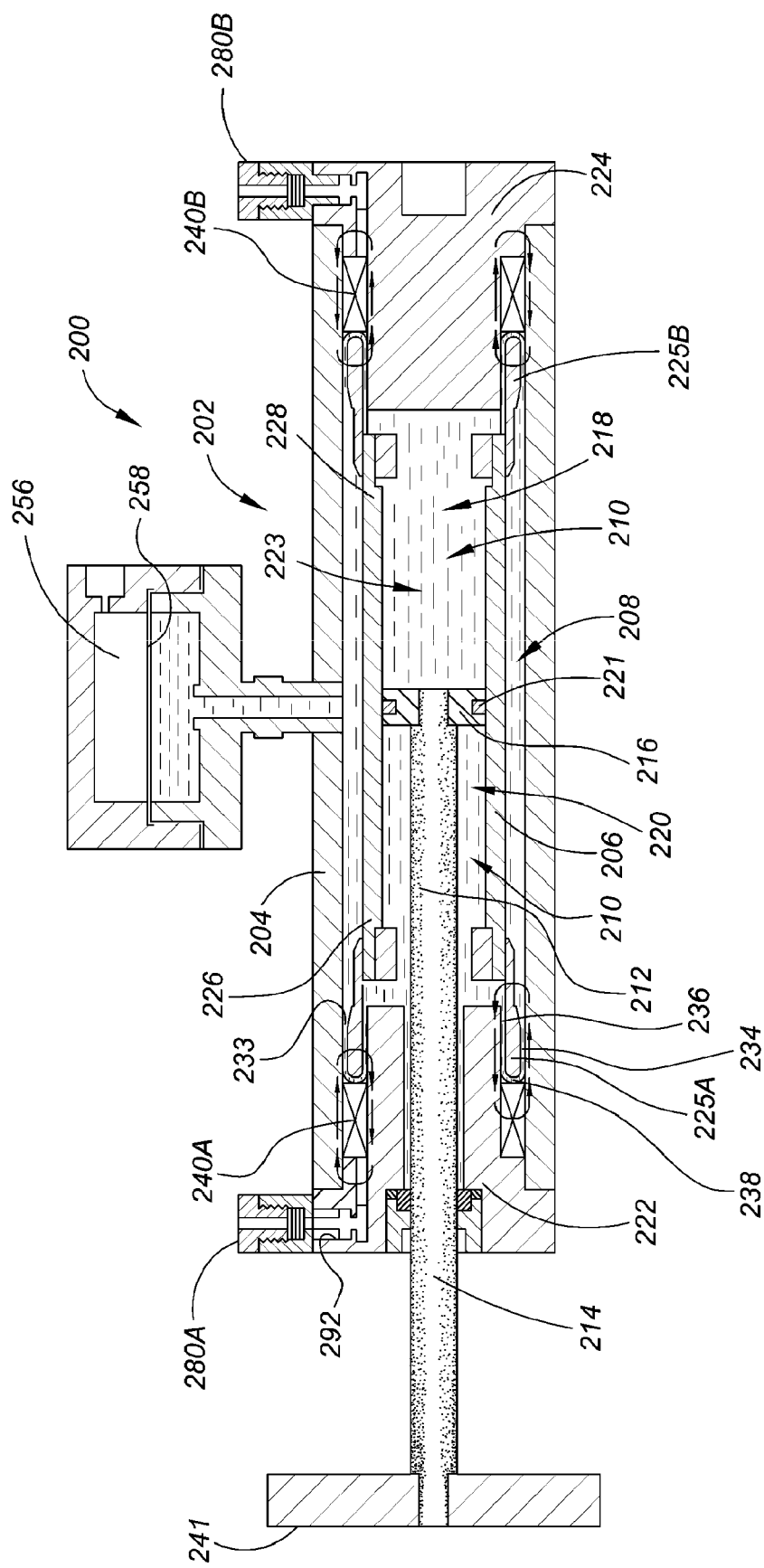
FIG. 3 is a schematic illustration in partial cross-sectional view of a second embodiment of a magnetorheological energy absorbing device.

Referring to FIG. 3, another embodiment of an MREA device 200 is illustrated. The MREA device 200 includes a damper assembly 202 that is bounded by an outer tube 204, with an inner tube 206 surrounded by the outer tube 204 such that an outer chamber 208 is partially defined between the two tubes 204, 206. The inner tube 206 defines an inner chamber 210. A piston 212 is movable within the tube 206 and includes a piston rod 214 and a piston head 216 secured to the rod 214. The piston head 216 is guided by and spans the inner chamber 210 and divides the inner chamber 210 into a first portion 218 that is on the opposite side of the piston head 216 from the rod 214, and a second portion 220 that is on the same side of the piston head 216 as the rod 214. The outer chamber 208 and the inner chamber 210 are filled with an MR fluid 223 having coated magnetizable particles and that is generally identical to the fluid 123 of FIGS. 2A and 2C. A piston ring 221 helps to seal the piston head 216 to the walls of the inner tube 206, ensuring that flow of MR fluid 223 within the MREA device 200, and especially within the cavities 233, is not compromised by unintended flow paths.

First and second magnetic end structure assemblies 222, 224 are positioned adjacent an inner tube annular extension 225A, 225B connected at the respective ends 226, 228 of the inner tube 206. The magnetic end structure assemblies 222, 224 in cooperation with the outer tube 204 form annular slots that receive and surround the inner tube annular extensions 225A, 225B, defining a consistently dimensioned gap or fluid cavity 233 between the outer tube 204, and the respective magnetic end structure assemblies 222, 224 and the inner tube annular extensions 225A, 225B. The fluid cavity 233, also referred to herein as a bi-fold MR valve, establishes a flow-reversing path, and includes an outer channel portion 234, an inner channel portion 236 parallel with the outer channel portion 234, and a looped portion 238 connecting the channel portions 234, 236. (The outer channel portion 234, inner channel portion 236 and looped portion 238 are numbered with respect to the magnetic end structure assembly 222; the magnetic end structure assembly 224 forms a like structure and cavity in a mirror image of magnetic end structure assembly 222, as is apparent in FIG. 3.) The openings at the ends of the inner channel portion 236 and the outer channel portion 234 open to the inner chamber 210 and the outer chamber 208, respectively. The entire fluid cavity 233 (channel portions 234, 236 and looped portion 238) is defined by surfaces of the inner tube annular extension 225A and of the magnetic structure assembly 222 that are smooth, i.e., without discontinuity in slope or curvature at adjacent portions, to promote laminar flow of fluid between the inner chamber 210 and the outer chamber 208 through the fluid cavity 233.

The fluid cavities 233 (channel portions 234, 236 and looped portion 238) present at either end of the inner chamber 210 fluidly connect the inner chamber 210 with the outer chamber 208, allowing MR fluid 223 to flow between the inner chamber 210 and the outer chamber 208 through the fluid cavities 233 as the piston 212 moves within the inner tube 206 such as in response to an impact on the movable impact member 241.

The first and second magnetic end structure assemblies 222, 224 each have an opening in which an annular electrical coil 240A, 240B, respectively, is retained. The coils 240A, 240B are configured to generate a magnetic field, as indicated by the arrows generally circulating around each cross-sectional area of the coils 240A, 240B in FIG. 3, causing the MR fluid 223 within the channel portions 234, 236 to attain a higher apparent viscosity, thus increasing the damping force of the damper assembly 202.

The MREA device 200 includes a pneumatic chamber 256 operatively connected with the MR fluid 223 through a flexible diaphragm 258. The pneumatic chamber 256 functions as an accumulator mechanism to accommodate the change in the volume of the rod 214 within the chamber 210 that results from piston rod 214 movement and to prevent cavitation of MR fluid 223 on the low pressure side (second portion 220 of inner chamber 210 as the piston 212 moves to the right in FIG. 3; first portion 218 of inner chamber 210 as the piston 212 moves to the left in FIG. 3). The pneumatic chamber 256 is moved between the coils 240A, 240B, which is a more centrally-positioned location than that of the pneumatic chamber 156 in FIG. 2A and is suitable for applications requiring a minimal overall length of the MREA device 200.

Figure 4:
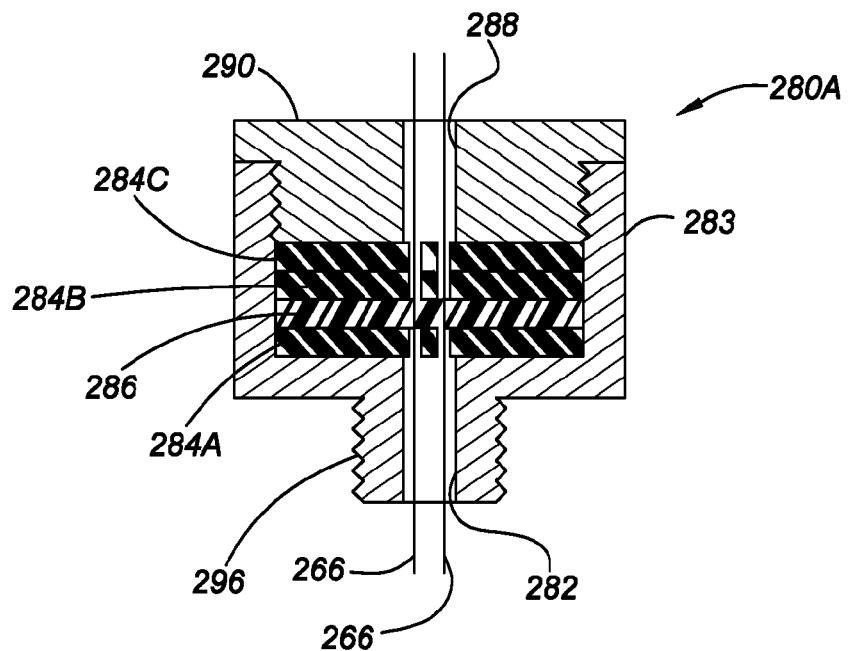
FIG. 4 is a schematic illustration in cross-sectional view of an electrical connector shown in FIG. 3.

The MREA device 200 includes electrical connectors 280A, 280B, shown best in FIG. 4, mounted to the magnetic end structure assemblies 222 and 224 and connected by wires 266 (shown in FIG. 4, not in FIG. 3) to the respective coils 240A, 240B. For better reliability of the MREA device 200 and ease in disassembly, the wires 266 go through central hole 282 of a socket 283 and are punched through a first layer of rubber disk 284A, then go through two small holes in an optional plastic disk layer 286, are punched through optional second and third layers of rubber disks 284B, 284C, and finally extend out through central hole 288 of plug 290. The plug 290 threads into the socket 283 by means of a thread (for example, a metric thread type) shown in FIG. 4 to tightly compress the rubber layers 284A-284C and the plastic layer 286 and produce enough stress at the contacting surface of the wires 266 and the rubber layers 284A-284C to seal the MR fluid 223 of FIG. 3 inside the MREA device 200 such that it does not leak past the coils 240A, 240B and through the openings in the magnetic end assemblies 222, 224 along the wires 266 to reach the connectors 280A, 280B. The socket 283 connects to a threaded wire outlet opening 292 in the magnetic end assembly 222 with the portion having the thread 296 shown in FIG. 4. The thread 296 is preferably NPT-type (American National Standard Taper Pipe Thread, a specification according to the American National Standards Institute) or NPTF-type (National Standard Dryseal Pipe Thread) to best seal the MR fluid 223.

Figure 5:
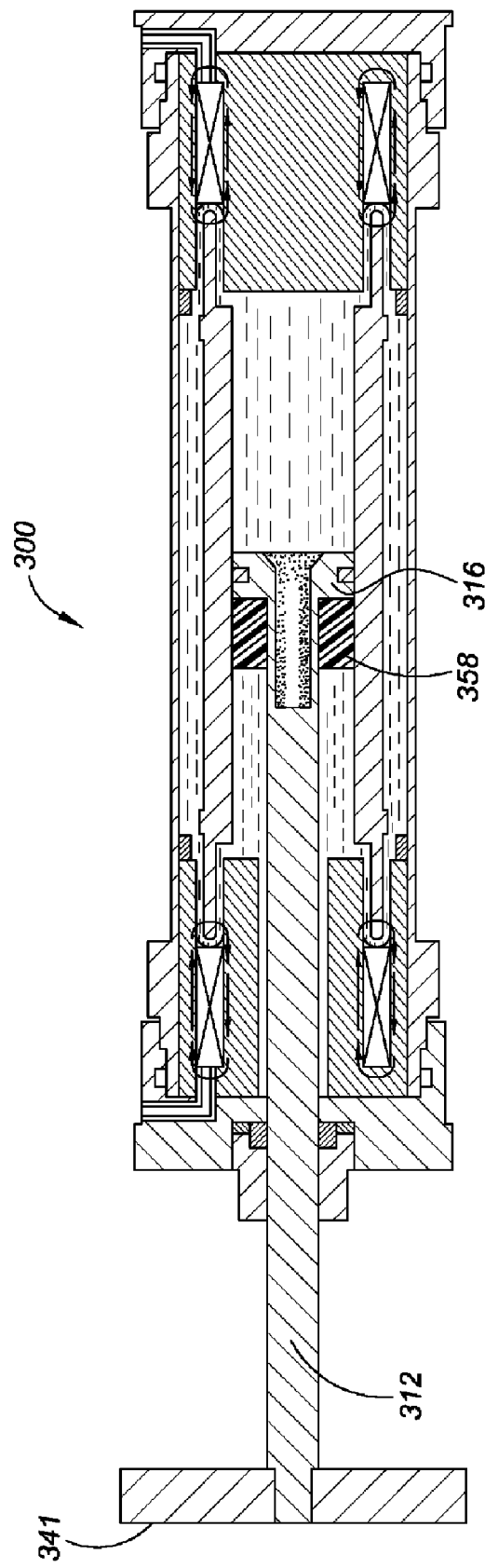
FIG. 5 is a schematic illustration in cross-sectional view of a third embodiment of a magnetorheological energy absorbing device.
Figure 6A:
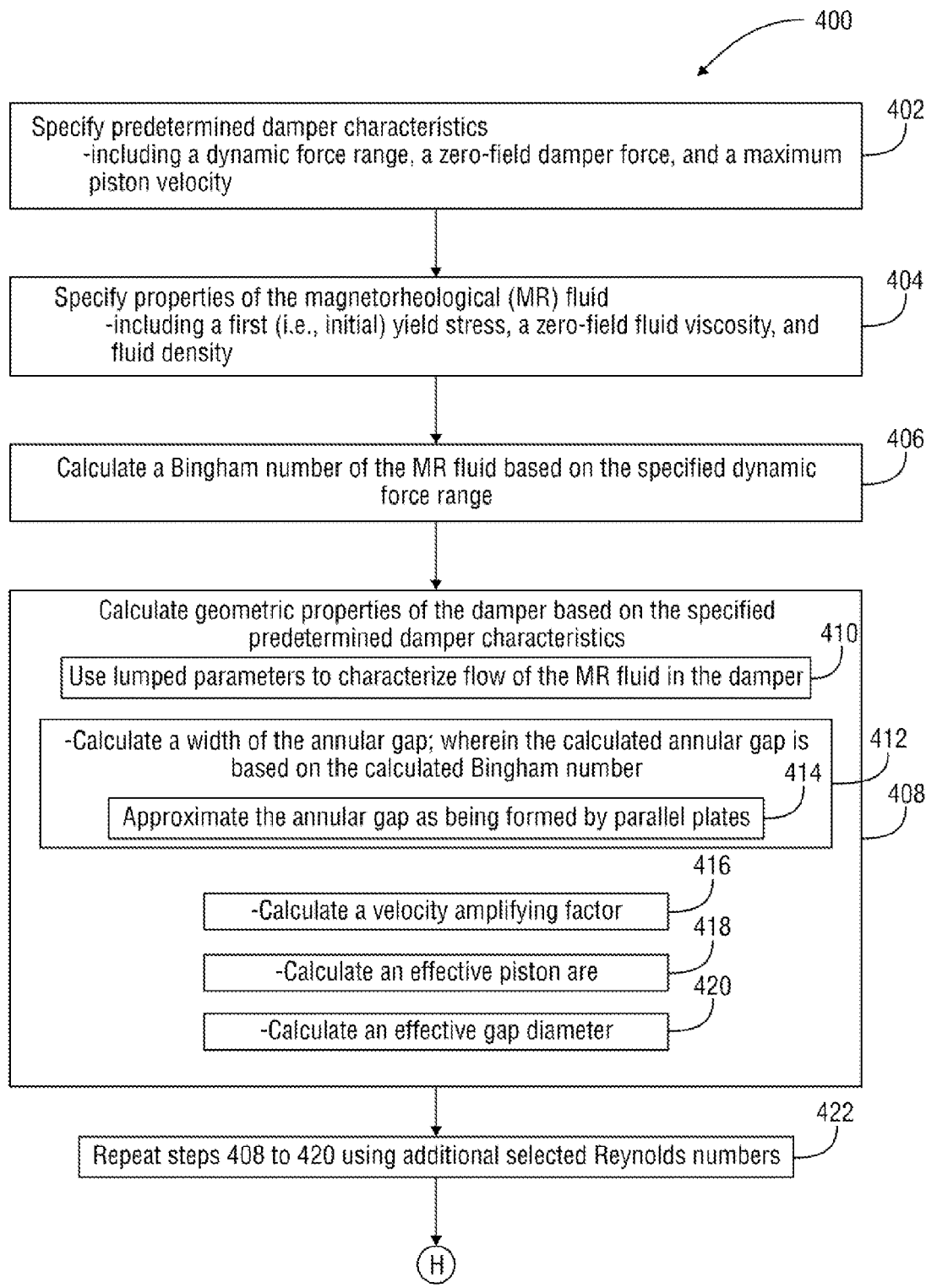
FIGS. 6A and 6B are a flow diagram of a method of designing a magnetorheological fluid energy absorbing device such as the device of FIGS. 2A-5.
Figure 6B:
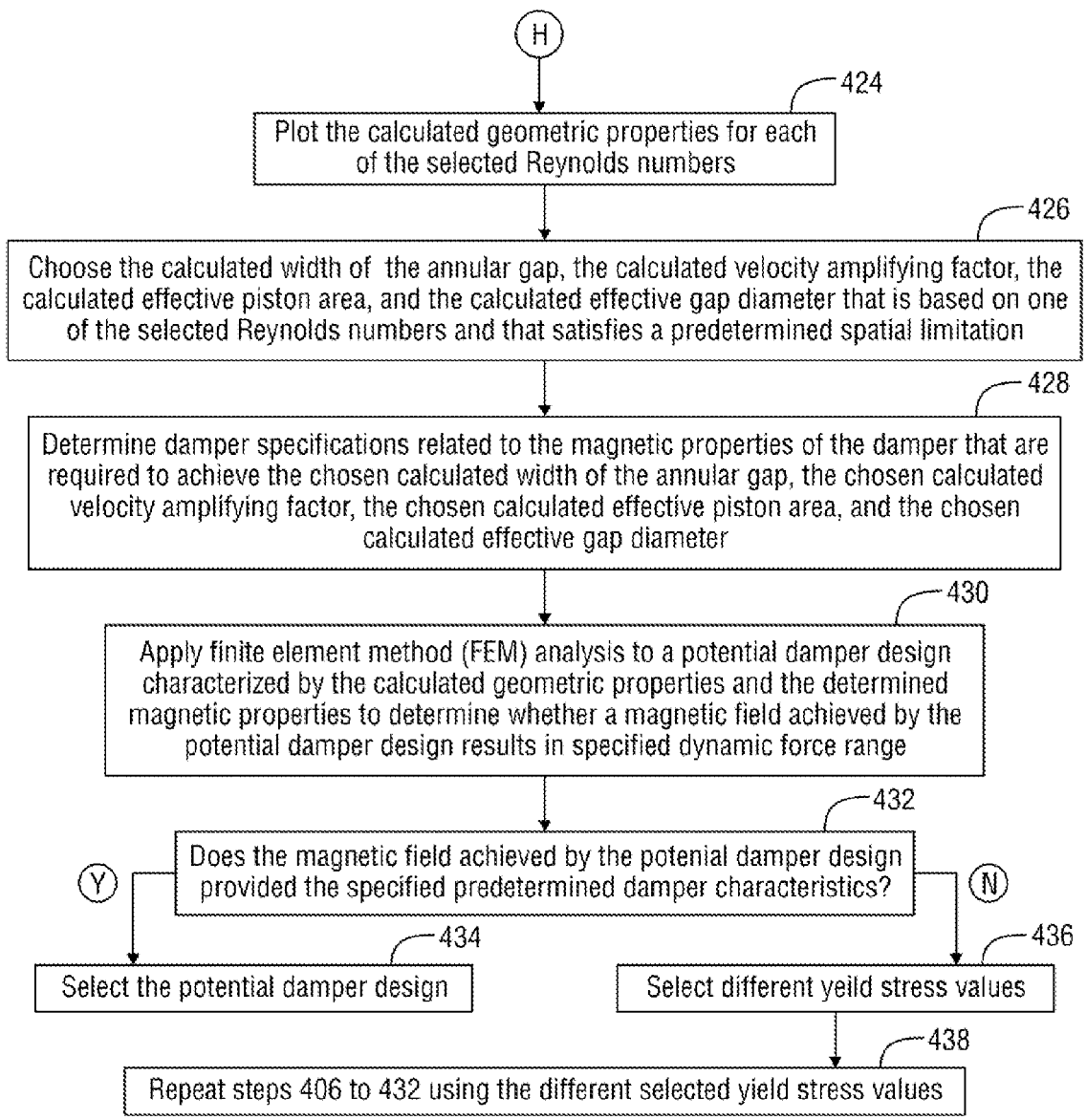

Referring to FIG. 5, another embodiment of an MREA device 300 is illustrated that is largely identical to MREA device 100 of FIG. 2A with the exception of the replacement of the pneumatic chamber 156 and diaphragm 158 with a compressible member 358 fitted to the rod-side of a piston head 316. This new configuration can reduce the spring effect associated with a pneumatic chamber and, in comparison to MREA device 100 of FIG. 2A, eliminates the potential for sedimentation of the magnetizable particles of the MR fluid in the channel connecting the inner chamber 110 with the fluid chamber 159 adjacent the diaphragm 158 in FIG. 2A. Also, the critical sealing requirements of high pressure gas of a pneumatic chamber are eliminated. The compressible member 358 compensates for the volume change due to movement of the piston rod 312 in the inner chamber at the backward side of the piston head 316 in response to impact on the impact member 341. The compressible member 358 may be a closed cell foam (e.g., rubber or sponge; or a closed cell ionomer foam with a compressibility around 50% and a compression stress around 50 psi) or a small gas chamber having, for example, air or nitrogen inside, or, still alternatively, bellows having a gas such as air or nitrogen inside. The overall length of the MREA device 300 is reduced by eliminating the pneumatic chamber, flexible diaphragm and fluid chamber adjacent the diaphragm, but this reduction may be at least partially offset by the need to increase the length to compensate for the decrease in maximum damper stroke created by the compressible member 358.

Referring to FIGS. 6A-6B, the design method 400 is used in order to effectively design an MR fluid energy absorbing damper, also referred to as an MREA device, based on a nonlinear damper model (i.e., taking into account that the behavior of the damper force at low piston velocities, i.e., in the pre-yield range, is nonlinear). The design method 400 allows the MREA devices such as devices 100, 200 and 300 described herein, to be evaluated, prior to actually building a prototype of the MREA device, to ascertain whether predetermined spatial limitations of a specific application will be met if the damper is designed using predetermined (i.e., desired) damper characteristics and MR fluid properties. The design method 400 may be carried out by an algorithm stored in a computer to quickly determine appropriate design parameters given the predetermined spatial limitations, damper characteristics and MR fluid properties.

The design method 400 can be initiated based on the following input, chosen variables: the desired dynamic force range $D_{des}$, the zero-field damper force $F_0$, the maximum piston velocity $V_p$, the zero-field fluid viscosity $\eta$, the fluid density $\rho$, and the initial yield stress $\tau_y$.

The damper force, F of a bi-fold MR fluid energy absorbing damper can be obtained as follows:

$$F = A_p (\Delta P_\eta + \Delta P_\tau)$$

where $$\Delta P_\eta = f \frac{\rho L V_d^2}{2 D_h} \text{ and } \Delta P_\tau = \frac{2 L \tau_y}{d}.$$

In these equations, $\Delta P_\eta$ is the Newtonian pressure drop, $\Delta P_\tau$ is the pressure drop due to the yield stress $\tau_y$ of an MR fluid, d is the width of the annulus gap of the MR valve inside the damper (e.g., the width of channel 133 in FIG. 2B), and L is the active length of the MR valve. $D_h$ is the hydraulic diameter which is used for non-circular valve path. For simplicity, the annulus gap of the MR valve inside the MR fluid energy absorbing damper is approximated by parallel plates. As a result, the hydraulic diameter $D_h$ is:

$$D_h = 2d.$$

The friction factor f for parallel plates is:

$$f = \frac{96}{Re_{D_h}} \quad \text{if } Re_{D_h} \leq 2300 \text{ (laminar)}$$

$$\frac{1}{f^{1/2}} = -1.8 \log_{10}\left[\left(\frac{\varepsilon/D_h}{3.7}\right)^{1.11} + \frac{6.9}{Re_{D_h}}\right] \quad \text{if } Re_{D_h} \geq 4000 \text{ (turbulent)}$$

where:

$$Re_{D_h} = \frac{2\rho V_d d}{\eta}.$$

Here, $\varepsilon$ is the average pipe wall roughness and assumed to be 0.01 mm to represent a smooth condition.

For the transition flow case, that is, the Reynolds number between 2300 and 4000, there is no corresponding defined equation to calculate the friction factor f. In the method 400, the convection algorithm is used to compute f for the transition flow as follows:

$$f = (1-\alpha) f_{lam} + \alpha f_{tub}$$

$$= (1-\alpha)\frac{96}{2300} + \alpha \frac{1}{\left\{1.8 \log_{10}\left[\left(\frac{\varepsilon/D_h}{3.7}\right)^{1.11} + \frac{6.9}{4000}\right]\right\}^2}$$

where:

$$\alpha = \frac{Re_{D_h} - 2300}{4000 - 2300}$$

with $f_{lam}$ being the friction factor for laminar flow and $f_{tub}$ being the friction factor for turbulent flow. If $Re_{D_h}$=2300, then $\alpha$=0 and only the laminar term is left in the above equation for the friction factor f. If $Re_{D_h}$=4000, then $\alpha$=1 and only the turbulent term is left in the above equation for the friction factor f.

$V_d$ is the average fluid velocity in the annulus gap of the MR valve given by:

$$V_d = \frac{A_p V_p}{A_d} = \overline{A} V_p$$

in which $A_p$ is the effective piston area, $A_d$ is the cross-sectional area of the annulus gap, and $V_p$ is the piston velocity. The dimensionless number $\overline{A} = A_p/A_d$ can be used as a fluid velocity amplifying factor. If $\overline{A}$ is a relatively large number, the fluid velocity in the gap, $V_d$, has a relatively high velocity even though the piston velocity $V_p$ is low. Using the above equation for $V_d$, the average fluid velocity in the annulus gap, the damping force of the MR fluid energy absorbing damper can be rewritten as follows:

$$F = F_\eta + F_\tau$$

$$= A_p \left( f \frac{\rho L \overline{A}^2 V_p^2}{4d} + \frac{2 L \tau_y}{d} \right)$$

Where $F_\eta$ is the viscous damping force associated with the Newtonian pressure drop, and $F_\tau$ is the damping force associated with the yield stress $\tau_y$ of an MR fluid. From this, the active length L can be obtained by $$L = \frac{F/A_p}{f \frac{\rho \overline{A}^2 V_p^2}{4d} + \frac{2 \tau_y}{d}}.$$

It is noted that the friction factor f in the above equation will be chosen depending on the magnitude of the Reynolds number of the fluid flow in the MR valve.

The damper force F of the MR fluid energy absorbing damper can be decomposed into a controllable damper force $F_\tau$ due to yield stress $\tau_y$ and uncontrollable damper force $F_{uc}$. The uncontrollable damper force includes a viscous damper force $F_\eta$ and a friction damper force $F_f$. The dynamic force range D (i.e., the tune-up ratio) is defined as the ratio of the total damper force F (corresponding to the damper force at field-on $F_{on}$) to the uncontrollable damper force $F_{uc}$ (corresponding to the damper force at field-off $F_{off}$) as follows:

$$D = \frac{F}{F_{uc}} = \frac{F_{on}}{F_{off}} = 1 + \frac{F_\tau}{F_\eta}.$$

The friction damper force, $F_f$, is neglected at this juncture because it is relatively small and can be easily incorporated into the experimental analysis. By substituting the equation for F above into the equation for D above, the dynamic force range is explicitly obtained as follows:

$$D = 1 + \frac{8\tau_y}{f\overline{A}^2 V_p^2}.$$

A Bingham number may be defined as:

$$Bi = \frac{\tau_y d}{\eta \overline{A} V_p}.$$

By substituting the equation for $Re_{D_h}$ into the equation for Bi, the relationship between the Bingham number Bi and the Reynolds number $Re_{D_h}$ is given as follows:

$$Bi = \left(\frac{2\rho d^2 \tau_y}{\eta^2}\right)\frac{1}{Re_{D_h}}.$$

Thus, the dynamic force range D can be represented in terms of the Bingham number and the Reynolds number as follows:

$$D = 1 + \frac{16}{f}\left(\frac{Bi}{Re_{D_h}}\right).$$

Along with the Reynolds number, substituting in values for the friction factor f, the dynamic force ranges are as follows:

$$D = 1 + \frac{Bi}{6} \quad \text{if } Re_{D_h} \leq 2300, \text{ and}$$

$$D = 1 + \frac{51.84 Bi\left(\log_{10}\left[\left(\frac{\varepsilon/D_h}{3.7}\right)^{1.11} + \frac{6.9}{Re_{D_h}}\right]\right)^2}{Re_{D_h}} \quad \text{if } Re_{D_k} \geq 4000.$$

The dynamic force range D is independent of the active length L as shown by the above equations. The fluid density $\rho$, viscosity $\eta$, yield stress $\tau_y$, the fluid amplifying factor $\overline{A}$, and the width of the annulus gap d of the MR valve affect the dynamic force range D. Once an MR fluid is chosen, the fluid density $\rho$, viscosity $\eta$, yield stress $\tau_y$ are determined at the same time. Accordingly, only the gap d and the fluid velocity amplifying factor $\overline{A}$ are geometric damper design parameters.

In light of the above mathematical equations modeling the relationship between various parameters and characteristics of an MR energy absorbing device, the method 400 begins with step 402, specifying predetermined damper characteristics, such as a desired dynamic force range $D_{des}$, the zero-field damper force $F_0$, and the maximum piston velocity $V_p$ of interest. Additionally, in step 404, the properties of the MR fluid are specified, such as fluid density $\rho$, viscosity $\eta$ (i.e., zero-field fluid viscosity), and yield stress $\tau_y$ (i.e., a first or initial yield stress is chosen). The inputs of steps 402 and 404 determine an initial or first potential damper design.

With the above inputs from steps 402 and 404, an algorithm stored in a processor can then run through steps 406 through 432 below, to determine if this initial potential damper design can meet performance expectations, such as the specified dynamic force range $D_{des}$, while satisfying any predetermined spatial limitations, such as a limitation on the overall size of the MR fluid energy absorbing damper.

Accordingly, in step 406, the Bingham number of the MR fluid having the above specified properties and based on the specified dynamic force range $D_{des}$ is calculated according to the formula:

$$D = 1 + \frac{Bi}{6};$$

and, accordingly, Bi=6(D−1).

Next, using the specified predetermined damper characteristics and MR fluid properties of steps 402 and 404, under step 408, geometric properties of the damper are calculated. The calculation of geometric properties under step 408 involves substep 410, using lumped parameters to characterize the flow of MR fluid in the annulus gap, in order to simplify the characterization of the MR fluid energy absorbing damper. Specifically, the Bingham number Bi, the Reynolds number Re, fluid density $\rho$, viscosity $\eta$, yield stress $\tau_y$ and the fluid amplifying factor $\overline{A}$ are all assumed to be uniform throughout the annulus gap d.

Specifically, step 408 involves steps 412, calculating a width of the annulus gap d; step 416, calculating a velocity amplifying factor; step 418, calculating and effective piston diameter; and step 420, calculating an effective gap diameter. In step 412, the width of the annular gap d is calculated based on the equation set forth above, $$Bi = \left(\frac{2\rho d^2 \tau_y}{\eta^2}\right)\frac{1}{Re_{D_h}}, \text{ with } Re_{D_h} \leq 2000.$$

A specific Reynolds number must be selected to perform step 412. As discussed above, this formula is based in part on the assumption of parallel plates to approximate the annulus gap. Accordingly, step 412 includes substep 414, approximating the annulus gap as being formed by parallel plates.

Step 416, calculating a velocity amplifying factor $\overline{A}$, utilizes the following formula also set forth above:

$$Bi = \frac{\tau_y d}{\eta \overline{A} V_p}.$$

Next, step 418 requires a calculation of the effective piston area $A_p$ from the equation set forth above:

$$A_p = \frac{4dF_0}{f(\rho \overline{A}^2 V_p^2)L} \text{ and } A_d.$$

Step 420 requires calculating the effective gap diameter $D_b$ from:

$$D_b = \frac{A_p}{\overline{A}\pi d}.$$

After completion of step 408 with the selected Reynolds number, under step 422, step 408, including substeps 410, 412, 414, 416, 418 and 420, is repeated multiple times, using a different selected Reynolds number for each repetition.

In step 424, the geometric properties calculated in step 408 is plotted for each of the selected Reynolds number values used in performing step 408 (i.e., in the initial performance of step 408 and the subsequent performances under step 422).

After the calculated geometric properties are plotted in step 424, one set of calculated geometric properties based on one of the Reynolds numbers (i.e., a calculated width of the annulus gap d, a calculated velocity amplifying factor $\overline{A}$, a calculated effective piston area $A_p$, and a calculated effective gap diameter $D_b$) is chosen in step 426 that satisfies a predetermined spatial limitation. Again, the predetermined spatial limitation may be an overall length of the MR fluid energy absorbing device, or another dimension determinable by the calculated geometric properties. The choice of calculated geometric properties may also take into account standard parts dimensions.

Once calculated geometric properties are chosen in step 426, step 428 determines the damper dimension related to magnetic properties of the damper. The "magnetic properties of the damper" referred to in step 428 may include dimensions such as coil size, turn number and magnetic flux return size using the principle of continuity of magnetic flux, $B_f A_f = B_s A_s$, where $A_f$ is the effective pole area in the gap d, and $A_s$ is the cross-sectional area of the magnetic flux return conduit. $B_f$ is the magnetic density of the MR fluid and $B_s$ is the magnetic density of the magnetic flux return conduit.

Next, in step 430, finite element method FEM analysis is carried out using FEM analysis software, and substep 432 determines from the FEM analysis whether a first potential damper design having the calculated geometric properties and the determined magnetic properties achieves a magnetic field that results in the specified dynamic force range $D_{des}$. Finite element analysis (FEA) is a computer simulation technique used in engineering analysis, as is understood by those skilled in the art. FEA uses a numerical technique called the finite element method (FEM).

If the FEM analysis of steps 430 and 432 indicates that a magnetic field is achieved that results in the specified dynamic range, then, under step 434, the first potential damper design is selected, as the damper meets spatial limitations, uses the specified damper characteristics and properties of the magnetic fluid, and results in a magnetic field that satisfies the specified dynamic force range $D_{des}$.

If steps 430 and 432 indicate that the magnetic field achieved by the potential damper design does not satisfy the specified dynamic force range $D_{des}$, then, under step 436, a different yield stress $\tau_y$ is chosen, and under step 438, steps 406 to 432 are repeated until a successful potential damper design is achieved (i.e., meeting spatial limitations, using the specified damper characteristics and properties of the magnetizable fluid, and resulting in a magnetic field that satisfies the specified dynamic force range $D_{des}$).

Accordingly, the method 400 applies a hydromechanical non-linear damper model using lumped parameters and specified damper characteristics and MR fluid properties to determine whether potential damper designs can achieve the specified damper characteristics while meeting predetermined spatial limitations.

While the best modes for carrying out the invention have been described in detail, those familiar with the art to which this invention relates will recognize various alternative designs and embodiments for practicing the invention within the scope of the appended claims.

The invention claimed is:

1. A method of designing a magnetorheological (MR) fluid energy absorbing damper comprising:
   specifying predetermined damper characteristics including a dynamic force range and a velocity parameter;
   specifying properties of the MR fluid including a yield stress;
   calculating a Bingham number for the MR fluid based on the specified dynamic force range;
   calculating geometric properties of the damper based on the specified predetermined damper characteristics and properties of the MR fluid, wherein said calculating geometric properties includes using lumped parameters to characterize flow of the MR fluid in the damper; wherein said calculating geometric properties includes calculating an annulus gap based at least partially on the calculated Bingham number; wherein the annulus gap is defined by the damper and MR fluid flows through the annulus gap;
   determining damper specifications related to magnetic properties of the damper and based at least partially on said calculated geometric properties; and
   applying finite element method analysis to a first potential damper design characterized by the calculated geometric properties and the determined damper specifications to determine whether a magnetic field is achieved by the potential damper design that provides the specified predetermined damper characteristics.

2. The method of claim 1, further comprising:
   selecting the first potential damper design if the magnetic field is achieved; and
   repeating the calculating geometric properties, determining damper specifications related to magnetic properties, and applying finite element method analysis to alternative potential damper designs characterized by different selected yield stress values if the magnetic field achieved by the first potential damper design does not provide the specified predetermined damper characteristics until a magnetic field is achieved by one of the alternative potential damper designs that provides the specified predetermined damper characteristics.

3. The method of claim 1, wherein the specified predetermined damper characteristics include, a zero-field damper force, and a maximum piston velocity; and wherein the calculated geometric properties of the damper include a cross-sectional area of the annulus gap, and an effective piston area.

4. The method of claim 1, wherein the first potential damper design is based on a predetermined geometric limitation of the damper.

5. A method of designing a magnetorheological (MR) fluid energy absorbing damper having a piston, wherein the damper defines an annulus gap through which the MR fluid is acted on by a magnetic field over a length, comprising:
   specifying predetermined damper characteristics including a dynamic force range, a zero-field damper force, and a maximum piston velocity;
   specifying properties of the MR fluid including a first yield stress;

calculating a width of the annulus gap based on the specified predetermined damper characteristics, specified properties of the MR fluid, and a selected Reynolds number for flow of the MR fluid in the annulus gap;

calculating a velocity amplifying factor based on the specified maximum piston velocity, the calculated width of the annulus gap, and at least some of the specified properties of the MR fluid, wherein the velocity amplifying factor is the ratio of the velocity of MR fluid in the annulus gap to the maximum piston velocity;

calculating an effective piston area based partially on the specified zero-field damper force, the maximum piston velocity, length, the calculated width of the annulus gap and the calculated velocity amplifying factor;

calculating an effective gap diameter for the annulus gap based on the calculated effective piston area, the calculated velocity amplifying factor and the calculated width of the gap;

repeating the calculating a width of the annulus gap, calculating a velocity amplifying factor, calculating an effective piston area, and calculating an effective gap diameter using additional selected Reynolds numbers;

choosing the calculated width of the annulus gap, the calculated velocity amplifying factor, the calculated effective piston area, and the calculated effective gap diameter that is based on one of the selected Reynolds numbers and that satisfies a predetermined spatial limitation;

determining damper specifications related to magnetic properties of the damper and required to achieve the chosen calculated width of the annulus gap, calculated velocity amplifying factor, calculated effective piston area, and calculated effective gap diameter; and determining whether a magnetic field established by the determined damper specifications results in the specified dynamic force range.

6. The method of claim 4, wherein the magnetic field has a first magnetic field value, and further comprising:

selecting different yield stress values if the first magnetic field value does not provide the specified dynamic force range;

calculating a width of the annulus gap, calculating a velocity amplifying factor, calculating an effective piston area, and calculating an effective gap diameter for selected Reynolds numbers based on the different yield stress values selected; and repeating the steps of calculating a width of the annulus gap, calculating a velocity amplifying factor, calculating an effective piston area, and calculating an effective gap diameter for the different yield stress values selected and using additional selected Reynolds numbers;

choosing the calculated width of the annulus gap, calculated velocity amplifying factor, calculated effective piston area, and calculated effective gap diameter calculated that is based on one of selected Reynolds numbers and that satisfies a predetermined spatial limitation;

determining damper specifications related to magnetic properties of the damper and required to achieve the chosen calculated width of the annulus gap, calculated velocity amplifying factor, calculated effective piston area, and calculated effective gap diameter; and determining whether a magnetic field established by the determined damper specifications results in the specified dynamic force range;

until the magnetic field established by the determined magnetic properties results in the specified dynamic force range.

7. The method of claim 5, wherein at least one of the velocity of the MR fluid in the annulus gap, the properties of the MR fluid, and the Reynolds number is a lumped parameter.

8. The method of claim 5, wherein the calculating a width of the annulus gap includes approximating the annulus gap as being formed by parallel plates.

9. The method of claim 5, further comprising:

plotting each of the calculated width of the annulus gap, calculated velocity amplifying factor, calculated effective piston area, and calculated effective gap diameter calculated using each of the selected Reynolds numbers; wherein the plotting is prior to choosing the calculated width of the annulus gap, calculated velocity amplifying factor, calculated effective piston area, and calculated effective gap diameter calculated that is based on one of selected Reynolds numbers and that satisfies a predetermined spatial limitation.

10. The method of claim 5, wherein determining whether a magnetic field established by the determined damper specifications results in the specified dynamic force range is based on applying finite element method analysis.

11. The method of claim 5, further comprising:

calculating a Bingham number for the MR fluid based on the specified dynamic force range.

12. A method of designing a bi-fold valve-type magnetorheological (MR) fluid energy absorbing damper having a piston, wherein the damper defines an annulus gap through which the MR fluid is acted on by a magnetic field over a length, comprising:

specifying a desired dynamic force range $D_{des}$, and a zero-field damper force $F_0$ at a maximum piston velocity $V_p$;

specifying properties of the MR fluid including zero-field fluid viscosity $\eta$, fluid density $\rho$, and an initial yield stress $\tau_y$;

calculating a Bingham number, Bi, of the MR fluid based on the desired dynamic force range $D_{des}$;

calculating a width of the annulus gap d assuming a hydraulic diameter $D_h$ of twice the width of the annulus gap and a selected Reynolds number of not greater than 2300;

calculating a fluid velocity amplifying factor $\overline{A}$ from $$Bi = \frac{\tau_y d}{\eta \overline{A} V_p};$$

calculating an effective piston area $A_p$ from $$A_p = \frac{4 d F_0}{f(\rho \overline{A}^2 V_p^2) L}$$

and $A_d$, wherein f is a friction factor for fluid flow between parallel plates, L is a length of the annulus gap through which MR fluid flows that is subject to a magnetic field and $A_d$ is the cross-sectional area of the annulus gap;

calculating an effective gap diameter $D_b$ from $$D_b = \frac{A_p}{\overline{A}\pi d};$$

repeating the calculating a width of the annulus gap, calculating a velocity amplifying factor, calculating an effective piston area, and calculating an effective gap diameter for additional selected Reynolds numbers;

plotting the values of the calculated width of the annulus gap d, the calculated fluid velocity amplifying factor $\overline{A}$, the calculated effective piston area $A_p$, and the calculated effective gap diameter $D_b$ with respect to each selected Reynolds number;

choosing the calculated width of the annulus gap, calculated velocity amplifying factor, calculated effective piston area, and calculated effective gap diameter that are calculated based on one of the selected Reynolds numbers and that satisfy a predetermined spatial limitation;

determining damper specifications related to magnetic properties of the damper and required to achieve the chosen calculated width of the annulus gap, calculated velocity amplifying factor, calculated effective piston area, and calculated effective gap diameter by using the principle of continuity of magnetic flux, $B_f A_f = B_s A_s$, where $A_f$ is an effective pole area in the gap, and $A_s$ is a cross-sectional area of a magnetic flux return conduit; $B_f$ is a magnetic density of the MR fluid and $B_s$ is a magnetic density of the magnetic flux return conduit;

applying finite element method (FEM) analysis to determine whether a magnetic field achieved by the determined damper specifications results in the desired dynamic force range $D_{des}$;

selecting a different yield stress if the magnetic field achieved by the determined damper specifications does not result in the desired dynamic force range $D_{des}$;

repeating the calculating a width of the annulus gap d, calculating a fluid velocity amplifying factor $\overline{A}$, calculating an effective piston area $A_p$, and calculating an effective gap diameter $D_b$ using the revised yield stress and for additional selected Reynolds numbers; and repeating the plotting, the choosing, the determining magnetic properties and the applying FEM analysis until a magnetic field established by the determined damper specifications results in the desired dynamic force range $D_{des}$.

\* \* \* \* \*